(12) United States Patent
Okada et al.

(10) Patent No.: US 6,589,920 B2
(45) Date of Patent: Jul. 8, 2003

(54) VISCOSITY MODIFIER FOR LUBRICATING OIL AND LUBRICATING OIL COMPOSITION

(75) Inventors: Keiji Okada, Kuga-gun (JP); Ryousuke Kaneshige, Ichihara (JP)

(73) Assignees: Mitsui Chemicals, Inc., Tokyo (JP); The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/964,485

(22) Filed: Sep. 28, 2001

(65) Prior Publication Data

US 2002/0035044 A1 Mar. 21, 2002

Related U.S. Application Data

(63) Continuation-in-part of application No. PCT/JP00/01902, filed on Mar. 28, 2000.

(30) Foreign Application Priority Data

Mar. 30, 1999 (JP) ............................................ 11-089389
Mar. 30, 1999 (JP) ............................................ 11-089408

(51) Int. Cl.⁷ ......................... C07C 9/00; C10M 143/02
(52) U.S. Cl. .............................. 508/591; 585/12; 585/18
(58) Field of Search ............................. 585/12; 508/591

(56) References Cited

U.S. PATENT DOCUMENTS

| | | | |
|---|---|---|---|
| 3,551,336 A | | 12/1970 | Jacobsen et al. |
| 3,691,078 A | | 9/1972 | Johnston et al. |
| 3,697,429 A | | 10/1972 | Engel et al. |
| 4,507,515 A | | 3/1985 | Johnston et al. |
| 4,922,046 A | * | 5/1990 | Kinoshita et al. ............. 585/11 |
| 4,933,099 A | * | 6/1990 | VerStrate ...................... 585/12 |
| 5,151,204 A | * | 9/1992 | Struglinski et al. ........... 585/12 |
| 5,217,636 A | * | 6/1993 | Paboucek .................... 585/10 |
| 5,446,221 A | * | 8/1995 | Struglinski ................... 585/12 |
| 5,641,736 A | * | 6/1997 | Forbus ........................ 508/469 |
| 5,955,639 A | * | 9/1999 | Oda et al. .................... 585/10 |
| 6,222,081 B1 | | 4/2001 | Burton et al. |
| 6,262,324 B1 | * | 7/2001 | Heilmann et al. ............ 585/12 |

FOREIGN PATENT DOCUMENTS

| | | |
|---|---|---|
| EP | 0 129 414 | 12/1984 |
| EP | 0 188 103 | 7/1986 |
| EP | 0 420 436 | 4/1991 |
| EP | 0 440 504 | 8/1991 |
| EP | WO 97/38019 | 10/1997 |
| EP | 0 848 020 | 6/1998 |
| EP | 0 887 355 | 12/1998 |
| EP | 0 902 081 | 3/1999 |
| JP | 56-37279 | 8/1981 |
| JP | 60-228260 | 11/1984 |
| JP | 61-143496 | 7/1986 |
| JP | 63-309592 | 12/1988 |
| JP | 3-131612 | 6/1991 |
| JP | 50-10322 | 1/1993 |
| JP | 5-148317 | 6/1993 |
| JP | 6-96624 | 4/1994 |
| JP | 6-192327 | 7/1994 |
| JP | 10-218942 | 8/1998 |

OTHER PUBLICATIONS

James C. Randall, Macromolecules, vol. 11, No. 1, pp. 33–36, 1978.
Macromolecule Analysis Handbook, p. 937, 1995 with attached English translation.

* cited by examiner

*Primary Examiner*—Jacqueline V. Howard
(74) *Attorney, Agent, or Firm*—Birch, Stewart, Kolasch & Birch, LLP

(57) ABSTRACT

The lubricating oil composition of the invention comprises a lubricating oil base (A) and a copolymer (B) of ethylene and an α-olefin of 3 to 20 carbon atoms. The copolymer (B) of ethylene and an α-olefin of 3 to 20 carbon atoms is contained in the composition in an amount of 1 to 20% by weight and has the following properties:

(1) the ethylene content (E) is in the range of 40 to 77% by weight,
(2) the weight-average molecular weight (Mw) in terms of polystyrene, as measured by GPC, is in the range of 80,000 to 400,000,
(3) Mw/Mn is not more than 2.4,
(4) the melting point (Tm), as measured by DSC, is not higher than 60° C.,
(5) the ethylene content (E, % by weight) and the melting point (Tm, ° C.), as measured by DSC, satisfy the following relation (I):

$$3.31 \times E - 186 \geq Tm \quad (I),$$

and (6) the intensity ratio, $S\alpha\beta/S\alpha\alpha$, measured by $^{13}$C-NMR spectrum is not more than 0.5.

17 Claims, No Drawings

VISCOSITY MODIFIER FOR LUBRICATING OIL AND LUBRICATING OIL COMPOSITION

This application is a Continuation-In-Part of PCT International Application No. PCT/JP00/01902 filed on Mar. 28, 2000, which designated the United States and on which priority is claimed under 35 U.S.C. §120, the entire contents of which are hereby incorporated by reference.

TECHNICAL FIELD

The present invention relates to a viscosity modifier for lubricating oil and a lubricating oil composition. More particularly, the invention relates to a viscosity modifier for lubricating oil, by the use of which a lubricating oil composition having excellent low-temperature properties and lubricity at high temperatures can be obtained, and a lubricating oil composition containing the viscosity modifier.

BACKGROUND ART

The viscosity of petroleum products generally varies greatly with temperature change, but the temperature dependence of the viscosity of, for example, a lubricating oil for automobile is desired to be small. On this account, an ethylene/α-olefin copolymer having a viscosity index improving effect has been widely used for the lubricating oil to make the temperature dependence smaller.

The lubricating oil loses flowability at low temperatures because a wax component in the lubricating oil is crystallized and solidified at low temperatures. In order to lower the solidifying temperature, a pour point depressant is contained in the lubricating oil, and the pour point depressant hinders formation of three-dimensional network that is due to crystallization of the wax component in the lubricating oil, and thereby lowers the pour point of the lubricating oil.

Of the low-temperature properties of the lubricating oil containing an ethylene/α-olefin copolymer and a pour point depressant, the viscosity under the conditions of a high shear rate depends upon compatibility of a lubricating oil base with the ethylene/α-olefin copolymer, while the viscosity under the conditions of a low shear rate is greatly influenced by the pour point depressant. It is known that when an ethylene/α-olefin copolymer having a specific composition is used, the effect of the pour point depressant is markedly reduced by the interaction between the copolymer and the pour point depressant (see U.S. Pat. No. 3,697,429 and U.S. Pat. No. 3,551,336).

Therefore, the ethylene/α-olefin copolymer added to the lubricating oil that particularly needs excellent low-temperature properties is desired not only to have an excellent viscosity index improving effect but also not to hinder the function of the pour point depressant.

In order to prevent the interaction between the pour point depressant and the ethylene/α-olefin copolymer, use of an ethylene/α-olefin copolymer obtained by a specific polymerizing apparatus and conditions and having an ununiform composition distribution as a viscosity index improver has been proposed (see Japanese Patent Laid-Open Publication No. 228600/1985). However, any lubricating oil having excellent low-temperature properties independent of the shear rate has not been obtained so far.

Under such circumstances as described above, the present inventor has made earnest studies and has found that by the use of a specific ethylene/α-olefin copolymer, decrease of the effect of the pour point depressant caused by the aforesaid interaction is not brought about, the compatibility with the lubricating oil base at low temperatures is adjusted, and thereby a lubricating oil having excellent low-temperature properties in every shear rate region can be obtained. Based on the finding, the present invention has been accomplished.

OBJECT OF THE INVENTION

It is an object of the present invention to provide a lubricating oil composition that is excellent in low-temperature properties, oxidative stability, lubricity at high temperatures and saving of fuel.

DISCLOSURE OF THE INVENTION

The viscosity modifier for lubricating oil according to the invention comprises an ethylene/α-olefin copolymer which is a copolymer of ethylene and an α-olefin of 3 to 20 carbon atoms and has the following properties:

(1) the ethylene content (E) is in the range of 40 to 77% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is not higher than 60° C., (5) the ethylene content (E, % by weight) and the melting point (Tm, ° C.), as measured by DSC, satisfy the following relation (I):

$$3.31 \times E - 186 \geq Tm \qquad (I),$$

and (6) the intensity ratio, $S\alpha\beta/S\alpha\alpha$, measured by $^{13}C$-NMR spectrum is not more than 0.5.

The ethylene/α-olefin copolymer is preferably an ethylene/propylene copolymer.

The lubricating oil composition according to the invention is a composition comprising:

(A) a lubricating oil base, and (B) an ethylene/α-olefin copolymer which is a copolymer of ethylene and an o-olefin of 3 to 20 carbon atoms and has the following properties:

(1) the ethylene content (E) is in the range of 40 to 77% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is not higher than 60° C., (5) the ethylene content (E, % by weight) and the melting point (Tm, ° C.), as measured by DSC, satisfy the following relation (I):

$$3.31 \times E - 186 \geq Tm \qquad (I),$$

and (6) the intensity ratio, $S\alpha\beta/S\alpha\alpha$, measured by $^{13}C$-NMR spectrum is not more than 0.5;

wherein the ethylene/α-olefin polymer (B) is contained in an amount of 1 to 20% by weight.

Further, the lubricating oil composition according to the invention is a composition comprising the lubricating oil base (A), the ethylene/α-olefin copolymer (B) and a pour point depressant (C), wherein:

the ethylene/α-olefin copolymer (B) is contained in an amount of 0.1 to 5% by weight, and the pour point depressant (C) is contained in an amount of 0.05 to 5% by weight.

The ethylene/α-olefin copolymer (B) is preferably an ethylene/α-olefin copolymer (B-1) having the following properties:

(1) the ethylene content (E) is in the range of 65 to 77% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is in the range of 15 to 60° C., (5) the ethylene content (E, % by weight) and the melting point (Tm, ° C.), as measured by DSC, satisfy the following relation (I):

$$3.31 \times E - 186 \geq Tm \quad (I),$$

and (6) the intensity ratio, Sαβ/Sαα, measured by $^{13}$C-NMR spectrum is not more than 0.5.

Further, the ethylene/α-olefin copolymer (B) is preferably an ethylene/α-olefin copolymer (B-2) having the following properties:

(1) the ethylene content (E) is in the range of 40 to 55% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is not higher than −20° C., (5) the ethylene content (E, % by weight) and the melting point (Tm, ° C.), as measured by DSC, satisfy the following relation (I):

$$3.31 \times E - 186 \geq Tm \quad (I),$$

and (6) the intensity ratio, Sαβ/Sαα, measured by $^{13}$C-NMR spectrum is not more than 0.5.

In the lubricating oil composition, the ethylene/α-olefin copolymer (B) is preferably an ethylene/propylene copolymer.

The ethylene/α-olefin copolymer (B) is preferably a copolymer having a ratio ($I_{10}/I_2$) of the melt index ($I_{10}$) as measured at 190° C. under a load of 10 kg to the melt index ($I_2$) as measured at 190° C. under a load of 2.16 kg ranging from 8 to 16.

Further, the ethylene/α-olefin copolymer (B) is preferably a copolymer having a ratio ($I_{10}/I_2$) of the melt index ($I_{10}$) as measured at 190° C. under a load of 10 kg to the melt index ($I_2$) as measured at 190° C. under a load of 2.16 kg being not less than 5 and less than 8.

BEST MODE FOR CARRYING OUT THE INVENTION

The viscosity modifier for lubricating oil and the lubricating oil composition according to the invention are described in detail hereinafter.

Viscosity Modifier for Lubricating Oil

The viscosity modifier for lubricating oil according to the invention comprises a copolymer of ethylene and an α-olefin (sometimes referred to simply as an "ethylene/α-olefin copolymer" simply hereinafter in this specification) having the following properties.

The ethylene/α-olefin copolymer has an ethylene content (E) (content of recurring units derived from ethylene) of usually 40 to 77% by weight. The ethylene content (E) is desired to be in the range of 65 to 77% by weight, preferably 68 to 74% by weight, particularly preferably 68 to 72% by weight, or in the range of 40 to 55% by weight, preferably 43 to 53% by weight, particularly preferably 45 to 51% by weight.

When the ethylene content is in the above range, a lubricating oil composition having satisfactory low-temperature properties can be obtained, and besides jellying of the lubricating oil composition at low temperatures due to crystallization of the ethylene sequence portions of the ethylene/α-olefin copolymer does not take place.

The ethylene content (E) in the ethylene/α-olefin copolymer can be determined by $^{13}$C-NMR in accordance with the method described in "Macromolecule Analysis Handbook" (Society of Japan Analytical Chemistry, edited by Macromolecule Analytical Research Meeting, published by Kinokuniya Shoten).

Examples of the α-olefins of 3 to 20 carbon atoms include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene.

Of the α-olefins, propylene is particularly preferable. That is, the ethylene/α-olefin copolymer is preferably an ethylene/propylene copolymer.

The ethylene/α-olefin copolymer for use in the invention preferably substantially consists of only constituent units derived from ethylene and constituent units derived from an α-olefin. The ethylene/α-olefin copolymer of this constitution is excellent particularly in low-temperature properties.

Moreover, when the ethylene/α-olefin copolymer does not contain a polyene and the like, it is excellent in heat resistance, especially free of oxidization and coloring, and excellent particularly in lubricating properties at high temperature.

The ethylene/α-olefin copolymer has a molecular weight, as measured in terms of a weight-average molecular weight (Mw) of polystyrene by gel permeation chromatography (GPC), of 80,000 to 400,000. When the weight-average molecular weight (Mw) is in the above range, the ethylene/α-olefin copolymer has excellent viscosity index improvability (thickening ability), and hence a small amount of the ethylene/α-olefin copolymer suffices to obtain a specific lubricating oil viscosity. Moreover, jellying hardly takes place at low temperatures, and the shear stability is good.

When the weight-average molecular weight (Mw) of the ethylene/α-olefin copolymer is in the range of 260,000 to 380,000, preferably 270,000 to 350,000, the viscosity index of the lubricating oil can be particularly improved. When the weight-average molecular weight (Mw) thereof is in the range of 100,000 to 240,000, preferably 120,000 to 240,000, the shear stability of the lubricating oil viscosity can be particularly improved.

The measurement by gel permeation chromatography (GPC) is carried out under the conditions of a temperature of 140° C. and a solvent of orthodichlorobenzene.

The ethylene/α-olefin copolymer desirably has Mw/Mn (Mw: weight-average molecular weight, Mn: number-average molecular weight), that is an indication of a molecular weight distribution of the copolymer, of not more than 2.4, preferably not more than 2.2. If the molecular weight distribution is not more than 2.4, the shear stability of the lubricating oil viscosity is good.

The ethylene/α-olefin copolymer has a melting point (Tm), as measured by a differential scanning calorimeter (DSC), of not higher than 60° C.

In particular, the melting point (Tm) of the ethylene/α-olefin copolymer having an ethylene content (E) of 65 to 77% by weight is desired to be in the range of 15 to 60° C., preferably 25 to 50° C., more preferably 25 to 45° C. The melting point (Tm) of the ethylene/α-olefin copolymer having an ethylene content (E) of 40 to 55% by weight, as measured by a differential scanning calorimeter (DSC), is desired to be not higher than −20° C., preferably not higher than −25° C., more preferably not higher than −30° C.

The melting point is determined by obtaining an endothermic curve by means of a differential scanning calorimeter (DSC), and the temperature at the maximum peak position of the endothermic curve is taken as the melting point. More specifically, a sample is placed in an aluminum pan, heated up to 200° C. at a rate of 10° C./min, maintained at 200° C. for 5 minutes, cooled to −150° C. at a rate of 20° C./min and then heated at a rate of 10° C./min to obtain a 2nd run endothermic curve, from which the melting point is determined.

The ethylene content (E, % by weight) and the melting point (Tm, ° C.) as measured by DSC preferably satisfy the following relation (relational expression)

$$3.31 \times E - 186 \geq Tm \qquad (I)$$

The relational expression (I) is a measure of composition distribution, and if the relationship between the ethylene content and the melting point is out of the relational expression (I), the composition distribution of the ethylene/α-olefin copolymer is widened to thereby lower the low-temperature resistance of the lubricating oil, and besides a problem of opaqueness (haze) of the lubricating oil is brought about by the presence of a high ethylene content portion. In the present invention, the ethylene/α-olefin copolymer is preferably one obtained by copolymerizing ethylene and an α-olefin using a catalyst comprising the later-described metallocene compound and ionizing ionic compound from the viewpoint of composition distribution.

The relational expression (I) as the composition distribution parameter is:

preferably $$3.31 \times E - 192 \geq Tm \qquad (I')$$

particularly preferably $$3.31 \times E - 192 \geq Tm \qquad (I'')$$

Preferably, the ethylene, propylene and α-olefin copolymer of the invention satisfy the intensity ratio, Sαβ/Sαα, measured by 13C-NMR spectrum of not more than 0.5. Each of the Sαβ and Sαα measured by $^{13}$C-NMR spectrum is a peak intensity of $CH_2$ in the units derived from ethylene or an α-olefin of 3 or more carbon atoms and they mean two kinds of $CH_2$ different in the position to the tertiary carbon as shown below;

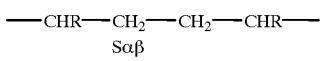
Sαβ

-continued

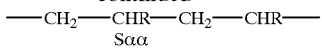
Sαα

The $^{13}$C-NMR spectrum thus measured was analyzed and then Sαβ, Sαα are determined in accordance with the method reported by J. C. Randall (Macromolecules, 11, 33 (1978)).

The intensity ratio Sαβ/Sαα is calculated from a ratio of an integral value (area) of each peak. It is generally considered that the thus obtained value of the intensity ratio is a measure indicating a ratio of such reactions as an occurrence of 1-2 addition reaction of α-olefin followed by 2-1 addition reaction or an occurrence of 2-1 addition reaction of α-olefin followed by 1-2 addition reaction. Consequently, it is indicated that the larger the intensity ratio is, more irregular the bonding direction of α-olefin is. On the other hand, the smaller the intensity ratio is, more regular the bonding direction of α-olefin is.

When the ratio satisfies the above formula (Sαβ/Sαα≦0.5), the fluidity of a lubricating oil at law temperature is improved and the lubricating properties at high temperature can also be improved. Further, the lubricating oil shows excellent balance of the lubricating properties at low temperature and high temperature.

Especially when film strength of an engine oil is required, the ratio ($I_{10}/I_2$) of a melt index of the ethylene/α-olefin copolymer as measured at 190° C. under a load of 10 kg to a melt index of the copolymer as measured at 190° C. under a load of 2.16 kg is desired to be in the range of 8 to 16, preferably 8.0 to 16, more preferably 8.0 to 16.0, still more preferably 8.0 to 13, particularly preferably 8.0 to 13.0.

Especially when shear stability of an engine oil is required, the ratio ($I_{10}/I_2$) of a melt index of the ethylene/α-olefin copolymer as measured at 190° C. under a load of 10 kg to a melt index of the copolymer as measured at 190° C. under a load of 2.16 kg is desired to be not less than 5 and less than 8, preferably not less than 5.0 and less than 8.0, more preferably not less than 5.5 and less than 7.5, still more preferably not less than 5.8 and less than 7.0.

The ethylene/α-olefin copolymer exhibits a high viscosity index improving effect and hardly hinder the effect of a pour point depressant when blended with a lubricating oil base.

When the ethylene/α-olefin copolymer is used as a viscosity modifier, a lubricating oil capable of satisfying low-temperature property standards of the GF-3 standards, which are standards of North America Lubricating Oil Standards of the next generation, can be obtained. Whether the lubricating oil satisfies the GF-3 standards or not can be judged by measuring the later-described CCS and MRV.

The ethylene/α-olefin copolymer for use as the lubricating oil viscosity modifier of the invention can be obtained by copolymerizing ethylene, an α-olefin of 3 to 20 carbon atoms, and if necessary, other monomers in the presence of an olefin polymerization catalyst.

Examples of the olefin polymerization catalysts employable herein include catalysts comprising a compound of a transition metal such as zirconium, hafnium or titanium, and an organoaluminum compound (organoaluminum oxy-compound) and/or an ionizing ionic compound. Of these, a metallocene catalyst comprising a metallocene compound of a transition metal selected from Group 4, etc. of the periodic table and an organoaluminum oxy-compound and/or an ionizing ionic compound is particularly preferably used in the invention.

Next, the metallocene catalyst is described.

The metallocene compound of a transition metal of Group 4 of the periodic table for forming the metallocene catalyst is specifically represented by the following formula (i).

$$ML_x \qquad (i)$$

In the formula (i), M is a transition metal selected from Group 4 of the periodic table, specifically zirconium, titanium or hafnium, and x is a valence of the transition metal.

L is a ligand coordinated to the transition metal, and of the ligands, at least one ligand L is a ligand having cyclopentadienyl skeleton. The ligand having cyclopentadienyl skeleton may have a substituent group.

Examples of the ligands having cyclopentadienyl skeleton include a cyclopentadienyl group; and alkyl-substituted or cycloalkyl-substituted cyclopentadienyl groups, such as methylcyclopentadienyl, ethylcyclopentadienyl, n- or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl; an indenyl group; a 4,5,6,7-tetrahydroindenyl group; and a fluorenyl group.

These groups may be substituted with halogen atoms and trialkylsilyl groups.

Of the above groups, alkyl-substituted cyclopentadienyl groups are particularly preferable.

When the compound represented by the formula (i) contains as the ligands L two or more groups having cyclopentadienyl skeleton, two of them may be bonded through an alkylene group such as ethylene or propylene, a substituted alkylene group such as isopropylidene or diphenylmethylene, a silylene group, or a substituted silylene group such as dimethylsilylene, diphenylsilylene or methylphenylsilylene.

The ligand L other than the ligand having cyclopentadienyl skeleton is, for example, a hydrocarbon group of 1 to 12 carbon atoms, an alkoxy group, an aryloxy group, a sulfonic acid-containing group ($-SO_3R^a$ wherein $R^a$ is an alkyl group, a halogen-substituted alkyl group, an aryl group, a halogen-substituted aryl group or an alkyl-substituted aryl group), a halogen atom or a hydrogen atom.

Examples of the hydrocarbon groups of 1 to 12 carbon atoms include alkyl groups, cycloalkyl groups, aryl groups and aralkyl groups. More specifically, there can be mentioned:

alkyl groups, such as methyl, ethyl, n-propyl, isopropyl, n-butyl, isobutyl, sec-butyl, t-butyl, pentyl, hexyl, octyl, decyl and dodecyl;

cycloalkyl groups, such as cyclopentyl and cyclohexyl;

aryl groups, such as phenyl and tolyl; and aralkyl groups, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

An example of the aryloxy group is phenoxy.

Examples of the sulfonic acid-containing groups ($-SO_3R^a$) include methanesulfonato, p-toluenesulfonato, trifluoromethanesulfonato and p-chlorobenzenesulfonato.

The halogen atom is fluorine, chlorine, bromine or iodine.

Examples of the metallocene compounds having zirconium as M and containing at least two ligands having cyclopentadienyl skeleton include:

bis(methylcyclopentadienyl)zirconium dichloride,
bis(ethylcyclopentadienyl)zirconium dichloride,
bis(n-propylcyclopentadienyl)zirconium dichloride,
bis(indenyl)zirconium dichloride, and
bis(4,5,6,7-tetrahydroindenyl)zirconium dichloride.

Compounds wherein the zirconium metal is replaced with a titanium metal or a hafnium metal in the above compounds are also employable.

Also employable as the metallocene compound is a compound represented by the following formula (ii):

$$L^1M^1X_2 \qquad\qquad (ii)$$

wherein M is a metal of Group 4 of the periodic table or a metal of lanthanide series, $L^1$ is a derivative of a delocalized n-bonding group and imparts a restraint geometric shape to the active site of the metal $M^1$, and each X is independently hydrogen, halogen, a hydrocarbon group containing 20 or less carbon atoms, a silyl group containing 20 or less silicon atoms, or a germyl group containing 20 or less germanium atoms.

Of the compounds represented by the formula (ii), a compound represented by the following formula (iii) is preferable.

(iii)

In the above formula, $M^1$ is titanium, zirconium or hafnium, and X is the same as above.

Cp is a substituted cyclopentadienyl group π-bonded to $M^1$ and having a substituent group Z.

Z is oxygen, sulfur, boron or an element of Group 14 of the periodic table (e.g., silicon, germanium or tin).

Y is a ligand containing nitrogen, phosphorus, oxygen or sulfur.

Z and Y may together form a condensed ring.

Examples of the metallocene compounds represented by the formula (iii) include:

(dimethyl(t-butylamido)(tetramethyl-$\eta^5$-cyclopentadienyl)silane)titanium dichloride,
((t-butylamido)(tetramethyl-$\eta^5$-cyclopentadienyl)-1,2-ethanediyl)titanium dichloride,
(dibenzyl(t-butylamido)(tetramethyl-$\eta^5$-cyclopentadienyl)silane)titanium dichloride,
(dimethyl(t-butylamido)(tetramethyl-$\eta^5$-cyclopentadienyl)silane)dibenzyltitanium,
(dimethyl(t-butylamido)(tetramethyl-$\eta^5$-cyclopentadienyl)silane)dimethyltitanium,
((t-butylamido)(tetramethyl-$\eta^5$-cyclopentadienyl)-1,2-ethanediyl)dibenzyltitanium,
((methylamido)(tetramethyl-$\eta^5$-cyclopentadienyl)-1,2-ethanediyl)dineopentyltitanium,
((phenylphosphido)(tetramethyl-$\eta^5$-cyclopentadienyl)methylene)diphenyltitanium,
(dibenzyl(t-butylamido)(tetramethyl-$\eta^5$-cyclopentadienyl)silane)dibenzyltitanium,
(dimethyl(benzylamido)($\eta^5$-cyclopentadienyl)silane)di(trimethylsilyl)titanium,
(dimethyl(phenylphosphido)(tetramethyl-$\eta^5$-cyclopentadienyl)silane)dibenzyltitanium,
((tetramethyl-$\eta^5$-cyclopentadienyl)-1,2-ethanediyl)dibenzyltitanium,
(2-$\eta^5$-(tetramethyl-cyclopentadienyl)-1-methyl-ethanolate(2-))dibenzyltitanium, (2-η⁵-(tetramethyl-cyclopentadienyl)-1-methyl-ethanolate(2-))dimethyltitanium, (2-((4a, 4b, 8a, 9,9a-η)-9H-fluorene-9-yl)cyclohexanolate(2-))dimethyltitanium, and (2-((4a, 4b, 8a, 9,9a-η)-9H-fluorene-9-yl)cyclohexanolate(2-))dibenzyltitanium.

Compounds wherein the titanium metal is replaced with a zirconium metal or a hafnium metal in the above compounds are also employable.

The metallocene compounds mentioned above can be used singly or in combination of two or more kinds.

In the present invention, a zirconocene compound having zirconium as the central metal atom and containing at least two ligands having cyclopentadienyl skeleton is preferably used as the metallocene compound represented by the formula (i). As the metallocene compound represented by the formula (ii) or (iii), a compound having titanium as the central metal atom is preferable. Of the metallocene compounds mentioned above, a compound represented by the formula (iii) and having titanium as the central metal atom is particularly preferable.

The organoaluminum oxy-compound for forming the metallocene catalyst may be aluminoxane hitherto known or a benzene-insoluble organoaluminum oxy-compound.

The hitherto known aluminoxane is represented by the following formula:

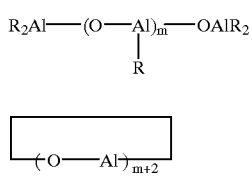

(iv)

(v)

In the formulas (iv) and (v), R is a hydrocarbon group, such as methyl, ethyl, propyl or butyl, preferably methyl or ethyl, particularly preferably methyl; and m is an integer of 2 or more, preferably an integer of 5 to 40.

The aluminoxane may be composed of mixed alkyloxy-aluminum units consisting of alkyloxyaluminum units represented by the formula OAl (R¹) and alkyloxyaluminum units represented by the formula OAl (R²) (each of R¹ and R² is the same hydrocarbon group as indicated by R, and R¹ and R² are groups different from each other).

Examples of the ionizing ionic compounds for forming the metallocene catalyst include Lewis acid and an ionic compound.

The Lewis acid is, for example, a compound represented by BR₃ (R is a phenyl group which may have a substituent group such as fluorine, methyl or trifluoromethyl, or fluorine). Examples of such compounds include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

The ionic compound is, for example, a trialkyl-substituted ammonium salt, an N,N-dialkylanilinium salt, a dialkylammonium salt or a triarylphosphonium salt.

Examples of the trialkyl-substituted ammonium salts include:
triethylammoniumtetra(phenyl)boron,
tripropylammoniumtetra(phenyl)boron,
tri(n-butyl)ammoniumtetra(phenyl)boron,
trimethylammoniumtetra(p-tolyl)boron,
trimethylammoniumtetra(o-tolyl)boron,
tributylammoniumtetra(pentafluorophenyl)boron,
tripropylammoniumtetra(o,p-dimethylphenyl)boron,
tributylammoniumtetra(m,m-dimethylphenyl)boron,
tributylammoniumtetra(p-trifluoromethylphenyl)boron, and
tri(n-butyl)ammoniumtetra(o-tolyl)boron.

Examples of the N,N-dialkylanilinium salts include:
N,N-dimethylaniliniumtetra(phenyl)boron,
N,N-diethylaniliniumtetra(phenyl)boron, and
N,N-2,4,6-pentamethylaniliniumtetra(phenyl)boron.

Examples of the dialkylammonium salts include:
di(1-propyl)ammoniumtetra(pentafluorophenyl)boron, and
dicyclohexylammoniumtetra(phenyl)boron.

Also employable as the ionic compound is triphenylcarbeniumtetrakis(pentafluorophenyl)borate, N,N-dimethylaniliniumtetrakis(pentafluorophenyl)borate or ferroceniumtetra(pentafluorophenyl)borate. In particular, the ionizing ionic compound is preferably used because it controls composition distribution of the ethylene/α-olefin copolymer.

For forming the metallocene catalyst, an organoaluminum compound may be used together with the organoaluminum oxy-compound and/or the ionizing ionic compound.

The organoaluminum compound is, for example, a compound represented by the following formula (vi):

$$R^1_n AlX_{3-n} \qquad (vi)$$

wherein R¹ is a hydrocarbon group of 1 to 15 carbon atoms, preferably 1 to 4 carbon atoms, X is a halogen atom or a hydrogen atom, and n is 1 to 3.

The hydrocarbon group of 1 to 15 carbon atoms is, for example, an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of the organoaluminum compounds include:
trialkylaluminums, such as trimethylaluminum, triethylaluminum, triisopropylaluminum, triisobutylaluminum, trioctylaluminum and tri-2-ethylhexylaluminum;

alkenylaluminums represented by the formula $(i\text{-}C_4H_9)_x Al_y (C_5H_{10})_z$ (wherein x, y and z are each a positive number, and $z \geq 2x$), such as isoprenylaluminum;

trialkenylaluminums, such as triisopropenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide, alkylaluminum dihalides, such as methylaluminum dichloride, ethylaluminum dichloride, isopropylaluminum dichloride and ethylaluminum dibromide;

dialkylaluminum hydrides, such as diethylaluminum hydride and dibutylaluminum hydride; and alkylaluminum dihydrides, such as ethylaluminum dihydride and propylaluminum dihydride.

In the present invention, ethylene, an α-olefin of 3 to 20 carbon atoms, and if necessary, other monomers are copolymerized in the presence of the metallocene catalyst, usually in a liquid phase. In the copolymerization, a hydrocarbon solvent is generally used as the polymerization solvent, but an α-olefin such as propylene may be used as the solvent.

Examples of the hydrocarbon solvents used in the polymerization include aliphatic hydrocarbons, such as pentane, hexane, heptane, octane, decane, dodecane and kerosine, and halogen derivatives thereof; alicyclic hydrocarbons, such as cyclohexane, methylcyclopentane and methylcyclohexane, and halogen derivatives thereof; and aromatic hydrocarbons, such as benzene, toluene and xylene, and halogen derivatives thereof such as chlorobenzene. These solvents can be used singly or in combination of two or more kinds.

Although ethylene, an α-olefin of 3 to 20 carbon atoms, and if necessary, other monomers can be copolymerized by any of batchwise and continuous processes, the copolymerization is preferably carried out continuously, and is particularly preferably carried out continuously using a stirring vessel type reactor. When the copolymerization is carried out continuously, the metallocene catalyst is used in, for example, the following concentration.

The concentration of the metallocene compound in the polymerization system is in the range of usually 0.00005 to 0.1 mmol/liter (polymerization volume), preferably 0.0001 to 0.05 mmol/liter. The organoaluminum oxy-compound is fed in such an amount that the molar ratio (Al/transition metal) of the aluminum atom to the transition metal in the metallocene compound in the polymerization system becomes usually 1 to 10000, preferably 10 to 5000.

The ionizing ionic compound is fed in such an amount that the molar ratio (ionizing ionic compound/metallocene compound) of the ionizing ionic compound to the metallocene compound in the polymerization system becomes 0.5 to 30, preferably 1 to 25.

When the organoaluminum compound is used, the compound is fed in an amount of usually about 0 to 5 mmol/liter (polymerization volume), preferably about 0 to 2 mmol/liter.

In the copolymerization of ethylene, an α-olefin of 3 to 20 carbon atoms, and if necessary, other monomers in the presence of the metallocene catalyst, the copolymerization reaction is carried out under the conditions of a temperature of usually −20 to 150° C., preferably 0 to 120° C., more preferably 0 to 100° C., and a pressure of more than 0 kg/cm² and not more than 80 kg/cm², preferably more than 0 kg/cm² and not more than 50 kg/cm². In a continuous polymerization process, these polymerization conditions are preferably held constant.

Although the reaction time (average residence time when the copolymerization is carried out continuously) varies depending upon the catalyst concentration, polymerization temperature, etc., it is in the range of usually 5 minutes to 5 hours, preferably 10 minutes to 3 hours.

Ethylene, an α-olefin of 3 to 20 carbon atoms, and if necessary, other monomers are fed to the polymerization system in such amounts that the ethylene/α-olefin copolymer having specific composition can be obtained. In the copolymerization, a molecular weight modifier such as hydrogen may be further used.

When ethylene, an α-olefin of 3 to 20 carbon atoms, and if necessary, other monomers are copolymerized as described above, the ethylene/α-olefin copolymer is usually obtained as a polymer solution containing the copolymer. The polymer solution is treated in a conventional manner, whereby the ethylene/α-olefin copolymer for use in the invention is obtained.

Lubricating Oil Composition

The lubricating oil composition according to the invention is a lubricating oil composition comprising a lubricating oil base (A) and the above-mentioned ethylene/α-olefin copolymer (B), or a lubricating oil composition comprising a lubricating oil base (A), the specific ethylene/α-olefin copolymer (B) and a pour point depressant (C).

The components for forming the lubricating oil composition of the invention are described below.

(A) Lubricating Oil Base

Examples of the lubricating oil bases (A) for use in the invention include mineral oils and synthetic oils such as poly-α-olefins, polyol esters, diesters (e.g., dioctyl phthalate, dioctyl sebacate) and polyalkylene glycols. A mineral oil or a blend of a mineral oil and a synthetic oil is preferably employed. The mineral oil is generally employed after subjected to refining such as dewaxing. Although mineral oils are divided into several classes according to the refining method, a mineral oil having a wax content of 0.5 to 10% is generally employed. For example, a highly refined oil produced by hydrocracking refining, having a low pour point and a high viscosity index and containing isoparaffin as a main component is employable. A mineral oil having a kinematic viscosity of 10 to 200 cSt at 40° C. is generally employed.

(B) Ethylene/α-olefin Copolymer

As the ethylene/α-olefin copolymer (B) for use in the present invention, the aforesaid ethylene/α-olefin copolymer is employed.

In the lubricating oil composition of the invention, particularly an ethylene/α-olefin copolymer (B-1) having the following properties is preferably employed as the ethylene/α-olefin copolymer (B);

(1) the ethylene content (E) is in the range of 65 to 77% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is in the range of 15 to 60° C., (5) the ethylene content (E, % by weight) and the melting point (Tm, ° C.), as measured by DSC, satisfy the following relation (I):

$$3.31 \times E - 186 \geq Tm \quad (I),$$

and (6) the intensity ratio, Sαβ/Sαα, measured by $^{13}$C-NMR spectrum is not more than 0.5.

Further, an ethylene/α-olefin copolymer (B-2) having the following properties can be also preferably employed as the ethylene/α-olefin copolymer (B);

(1) the ethylene content (E) is in the range of 40 to 55% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is not higher than −20° C., (5) the ethylene content (E, % by weight) and the melting point (Tm, ° C.), as measured by DSC, satisfy the following relation (I):

$$3.31 \times E - 186 \geq Tm \quad (I),$$

and (6) the intensity ratio, Sαβ/Sαα, measured by $^{13}$C-NMR spectrum is not more than 0.5.

The copolymer (B) is preferably an ethylene/α-olefin copolymer having a ratio ($I_{10}/I_2$) of the melt index ($I_{10}$) as measured at 190° C. under a load of 10 kg to the melt index (I$_2$) as measured at 190° C. under a load of 2.16 kg ranging from 8 to 16.

Further, the copolymer (B) is preferably an ethylene/α-olefin copolymer having a ratio (I$_{10}$/I$_2$) of the melt index (I$_{10}$) as measured at 190° C. under a load of 10 kg to the melt index (I$_2$) as measured at 190° C. under a load of 2.16 kg being not less than 5 and less than 8.

(C) Pour Point Depressant

Examples of the pour point depressants for use in the invention include alkylated naphthalene, (co)polymers of alkyl methacrylates, (co)polymers of alkyl acrylates, copolymers of alkyl fumarates and vinyl acetate, α-olefin polymers, and copolymers of α-olefins and styrene. Of these, (co)polymers of alkyl methacrylates and (co)polymers of alkyl acrylates are preferably employed.

Lubricating Oil Composition

The first embodiment of the lubricating oil composition of the invention comprises the lubricating oil base (A) and the ethylene/α-olefin copolymer (B). In this lubricating oil composition, the ethylene/α-olefin copolymer (B) is contained in an amount of 1 to 20% by weight, preferably 5 to 10% by weight (residue: lubricating oil base (A) and additives described later).

Such a lubricating oil composition exhibits small temperature dependence and has excellent low-temperature properties. The lubricating oil composition can be used as it is as a lubricating oil, or can be used as a lubricating oil after further blended with a lubricating oil base, a pour depressant, etc.

The second embodiment of the lubricating oil composition of the invention comprises the lubricating oil base (A), the ethylene/α-olefin copolymer (B) and the pour point depressant (C). In this lubricating oil composition, the ethylene/α-olefin copolymer (B) is contained in an amount of 0.1 to 5% by weight, preferably 0.2 to 1.5% by weight, more preferably 0.25 to 1.5% by weight, particularly preferably 0.30 to 1.5% by weight, and the pour point depressant (C) is contained in an amount of 0.05 to 5% by weight, preferably 0.1 to 3% by weight, more preferably 0.1 to 2% by weight, most preferably 0.2 to 1.5% by weight, (residue: lubricating oil base (A) and additives described later). When the amount of the ethylene/α-olefin copolymer (B) in the lubricating oil composition of the invention is not less than 0.1% by weight, a viscosity improving effect can be obtained, and when the amount thereof is not more than 5% by weight, the effect of the pour point depressant (C) is not hindered, so that the above range is preferable. When the amount of the ethylene/α-olefin copolymer (B) is in the above range, a lubricating oil composition having improved viscosity and excellent flowability at low temperatures can be obtained.

Such a lubricating oil composition exhibits small temperature dependence and small rise of the pour point, said rise being attributed to the interaction between the ethylene/α-olefin copolymer and the pour point depressant, and has excellent low-temperature properties in every shear rate region. Moreover, the lubricating oil composition has excellent high-temperature properties and shows good lubricity, so that it is advantageous in saving of fuel.

In the lubricating oil composition of the invention, additives exhibiting viscosity index improving effect, such as (co)polymers of alkyl methacrylates, hydrogenated SBR or SEBS, and other additives, such as detergent, rust preventive agent, dispersant, extreme pressure agent, anti-foaming agent, antioxidant and metal deactivator, may be contained in addition to the lubricating oil base (A), the ethylene/α-olefin copolymer (B) and the pour point depressant (C).

The lubricating oil composition of the invention can be prepared in the following manner: the ethylene/α-olefin copolymer (B), and if necessary, additives are mixed with or dissolved in the lubricating oil base (A) in accordance with a known method; or the ethylene/α-olefin copolymer (B), the pour point depressant (C), and if necessary, additives are mixed with or dissolved in the lubricating oil base (A) in accordance with a known method.

In the present specification, all numerical values for the amounts of materials, reaction conditions, molecular weights, carbon atom numbers, etc. are desirably understood to be supplemented with a term "about" so long as their meanings do not become technically indefinite, with the exception of the following examples or unless otherwise stated.

Further, the following embodiments (i) to (ix) can be mentioned in the present invention.

(i) A viscosity modifier for lubricating oil comprises an ethylene/α-olefin copolymer which is a copolymer of ethylene and an α-olefin of 3 to 20 carbon atoms, and has the following properties:

(1) the ethylene content (E) is in the range of 40 to 77% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is not higher than 60° C., (5) the ethylene content (E, % by weight) and the melting point (Tm, ° C.), as measured by DSC, satisfy the following relation (I):

$$3.31 \times E - 186 \geq Tm \qquad (I),$$

and (6) the proportion (V, %) of αβ carbon atoms and the ethylene content (E, % by weight) satisfy the following relation (II):

$$V \leq 10 - 0.1 \times E \qquad (II).$$

(ii) In the above viscosity modifier for lubricating oil (i), the ethylene/α-olefin copolymer is an ethylene/propylene copolymer.

(iii) A lubricating oil composition comprises:

(A) a lubricating oil base, and (B) an ethylene/α-olefin copolymer which is a copolymer of ethylene and an α-olefin of 3 to 20 carbon atoms, and has the following properties:

(1) the ethylene content (E) is in the range of 40 to 77% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is not higher than 60° C., (5) the ethylene content (E, % by weight) and the melting point (Tm, ° C.), as measured by DSC, satisfy the following relation (I):

$$3.31 \times E - 186 \geq Tm \qquad (I),$$

and (6) the proportion (V, %) of αβ carbon atoms and the ethylene content (E, % by weight) satisfy the following relation:

$$V \leq 10 - 0.1 \times E \quad (II);$$

wherein the ethylene/α-olefin polymer (B) is contained in an amount of 1 to 20% by weight.

(iv) A lubricating oil composition comprises:
(A) the lubricating oil base,
(B) the ethylene/α-olefin copolymer, and
(C) a pour point depressant (C),
wherein the ethylene/α-olefin copolymer (B) is contained in an amount of 0.1 to 5% by weight, and the pour point depressant (C) is contained in an amount of 0.05 to 5% by weight.

(v) In the above lubricating oil composition (iii) or (iv), the ethylene/α-olefin copolymer (B) is an ethylene/α-olefin copolymer (B-1) having the following properties:

(1) the ethylene content (E) is in the range of 65 to 77% by weight,
(2) the weight-average molecular weight (Mw) in terms of polystyrene, as measured by GPC, is in the range of 80,000 to 400,000,
(3) Mw/Mn is not more than 2.4,
(4) the melting point (Tm), as measured by DSC, is in the range of 15 to 60° C.,
(5) the ethylene content (E, % by weight) and the melting point (Tm, ° C.), as measured by DSC, satisfy the following relation (I):

$$3.31 \times E - 186 \geq Tm \quad (I),$$

and (6) the proportion (V, %) of αβ carbon atoms and the ethylene content (E, % by weight) satisfy the following relation (II):

$$V \leq 10 - 0.1 \times E \quad (II).$$

(vi) In the above lubricating oil composition (iii) or (iv), the ethylene/α-olefin copolymer (B) is an ethylene/α-olefin copolymer (B-2) having the following properties:

(1) the ethylene content (E) is in the range of 40 to 55% by weight,
(2) the weight-average molecular weight (Mw) in terms of polystyrene, as measured by GPC, is in the range of 80,000 to 400,000,
(3) Mw/Mn is not more than 2.4,
(4) the melting point (Tm), as measured by DSC, is not higher than −20° C.,
(5) the ethylene content (E, % by weight) and the melting point (Tm, ° C.), as measured by DSC, satisfy the following relation (I):

$$3.31 \times E - 186 \geq Tm \quad (I),$$

and (6) the proportion (V, %) of αβ carbon atoms and the ethylene content (E, % by weight) satisfy the following relation (II):

$$V \geq 10 - 0.1 \times E \quad (II).$$

(vii) In any of the above lubricating oil compositions (iii) to (vi), the ethylene/α-olefin copolymer (B) is an ethylene/propylene copolymer.

(viii) In any of the above lubricating oil compositions (iii) to (vii), the ethylene/α-olefin copolymer (B) is preferably an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg ranging from 8 to 16.

(ix) In any of the above lubricating oil compositions (iii) to (vii), the ethylene/α-olefin copolymer (B) is preferably an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg being not less than 5 and less than 8.

The term "proportion (V;%) of αβ carbon atoms" used herein means a proportion of the αβ carbon atoms to specific carbon atoms for forming the ethylene/α-olefin copolymer. The proportion of αβ carbon atoms can be measured by $^{13}$C-NMR of the copolymer, followed by determining Sαα, Sαβ, Sαδ, Sαγ, Sαδ, Sβδ, Sδδ, Sγδ and Sβγ in accordance with the method described in J. C. Randall "Macromolecules"(11 33 (1978)). Each of the Sαα, Sαβ, Sαδ, Sαγ, Sαδ, Sβδ, Sδδ, Sγδ and Sβγ measured by 13C-NMR is a peak intensity (integration value) of methylene ($CH_2$) positioned specifically to the tertiary carbon. The proportion is calculated from the following formula.

$$\text{Proportion of } \alpha\beta \text{ carbon atoms } (V;\%) = \frac{S\alpha\beta}{(S\alpha\alpha + 3/4 S\alpha\beta + S\alpha\gamma + S\alpha\delta + 1/2(S\beta\delta + S\delta\delta) + 1/4(S\gamma\delta + S\beta\gamma))} \times 100$$

If this value (V) satisfies the above relation (V≤10−0.1× E), the fluidity of the lubricating oil at low temperature can be improved and the lubricating properties at high temperature can also be improved. Further, the lubricating oil shows excellent balance of the lubricating properties at low temperature and high temperature.

Still further, the following embodiments (x) to (xviii) can be mentioned in the present invention.

(x) A viscosity modifier for lubricating oil comprises an ethylene/α-olefin copolymer which is a copolymer of ethylene and an α-olefin of 3 to 20 carbon atoms, prepared by using a metallocene catalyst, and has the following properties:

(1) the ethylene content (E) is in the range of 40 to 77% by weight,
(2) the weight-average molecular weight (Mw) in terms of polystyrene, as measured by GPC, is in the range of 80,000 to 400,000,
(3) Mw/Mn is not more than 2.4,
(4) the melting point (Tm), as measured by DSC, is not higher than 60° C., and
(5) the ethylene content (E, % by weight) and the melting point (Tm, ° C.), as measured by DSC, satisfy the following relation (I):

$$3.31 \times E - 186 \geq Tm \quad (I).$$

(xi) In the above viscosity modifier for lubricating oil (x), the ethylene/α-olefin copolymer is preferably an ethylene/propylene copolymer.

(xii) A lubricating oil composition comprises:
(A) a lubricating oil base, and
(B) an ethylene/α-olefin copolymer which is a copolymer of ethylene and an α-olefin of 3 to 20 carbon atoms, prepared by using a metallocene catalyst, and has the following properties:

(1) the ethylene content (E) is in the range of 40 to 77% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is not higher than 60° C., and (5) the ethylene content (E, % by weight) and the melting point (Tm, ° C.), as measured by DSC, satisfy the following relation (I):

$$3.31 \times E - 186 \geq Tm \quad (I),$$

wherein the ethylene/α-olefin copolymer (B) is contained in an amount of 1 to 20% by weight.

(xiii) A lubricating oil composition comprises:
(A) the lubricating oil base,
(B) the ethylene/α-olefin copolymer, and
(C) a pour point depressant,
wherein the ethylene/α-olefin copolymer (B) is contained in an amount of 0.1 to 5% by weight, and the pour point depressant (C) is contained in an amount of 0.05 to 5% by weight.

(xiv) In the above lubricating oil composition (xii) or (xiii), the ethylene/α-olefin copolymer (B) is preferably an ethylene/α-olefin copolymer (B-1) prepared by using a metallocene catalyst and having the following properties:

(1) the ethylene content (E) is in the range of 65 to 77% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is in the range of 15 to 60° C., and (5) the ethylene content (E, % by weight) and the melting point (Tm, ° C.), as measured by DSC, satisfy the following relation (I):

$$3.31 \times E - 186 \geq Tm \quad (I)$$

(xv) In the above lubricating oil composition (xii) or (xiii), the ethylene/α-olefin copolymer (B) is preferably an ethylene/α-olefin copolymer (B-2) prepared by using a metallocene catalyst and having the following properties:

(1) the ethylene content (E) is in the range of 40 to 55% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is not higher than −20° C., and (5) the ethylene content (E, % by weight) and the melting point (Tm, ° C.), as measured by DSC, satisfy the following relation (I):

$$3.31 \times E - 186 \geq Tm \quad (I).$$

(xvi) In any of the above lubricating oil compositions (xii) to (xv), the ethylene/α-olefin copolymer (B) is preferably an ethylene/propylene copolymer.

(xvii) In any of the above lubricating oil compositions (xii) to (xvi), the ethylene/α-olefin copolymer (B) is preferably an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg ranging from 8 to 16.

(xviii) In any of the above lubricating oil compositions (xii) to (xvi), the ethylene/α-olefin copolymer (B) is preferably an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg being not less than 5 and less than 8.

Effect of the Invention

The lubricating oil composition of the invention is excellent in the low-temperature properties and the lubricity at high temperatures.

EXAMPLE

The present invention is further described with reference to the following examples, but it should be construed that the invention is in no way limited to those examples.

In the examples, various properties were measured in the following manner.

Ethylene Content (E)

The ethylene content was measured in a mixed solvent of orthodichlorobenzene and benzene-d6 (orthodichlorobenzene/benzene-d6=3/1–4/1, by volume) using a nuclear magnetic resonance apparatus of Japan Electron Optics Laboratory LA500 Model under the conditions of a temperature of 120° C., a pulse width of 45° pulse and a pulse repetition time of 5.5 seconds.

Viscosity at 100° C. (K. V.)

The viscosity was measured in accordance with ASTM D 445. In the examples, adjustment was made so as to obtain K. V. of about 10 mm$^2$/sec.

Cold Cranking Simulator (CCS)

CCS was measured in accordance with ASTM D 2602. The CCS is used to evaluate sliding properties (starting properties) at low temperatures at the crank shaft. A smaller value of CCS indicates better low-temperature properties of a lubricating oil.

Mini-Rotary Viscometer (MRV)

MRV was measured in accordance with ASTM D 3829 and D 4684. The MRV is used to evaluate pumping performance of an oil pump at low temperatures. A smaller value of MRV indicates better low-temperature properties of a lubricating oil.

Shear Stability Index (SSI)

SSI was measured in accordance with ASTM D 3945. The SSI is a measure of kinematic viscosity loss that is caused by break of molecular chain of a copolymer component in a lubricating oil when the copolymer component suffers a shear force under the sliding motion. A larger value of SSI indicates larger loss of kinematic viscosity.

High Temperature High Shear Viscosity (HTHS)

HTHS was measured under the conditions of 150° C./10$^6$s$^{-1}$ in accordance with ASTM D 4624. The HTHS is used to evaluate lubricating oil performance at high temperatures at a high shear rate. A larger value of HTHS indicates better lubricating oil performance at high temperatures.

Low-temperature storage stability

After a lubricating oil was cooled at −18° C. for 2 weeks, flowability (appearance) of the lubricating oil was observed and evaluated as follows.

AA: The lubricating oil flows.

BB: The lubricating oil does not flow (in gel state).

Polymerization Example 1

Synthesis of Olefin Copolymer

In a 2-liter autoclave (made of SUS) equipped with a stirring blade, said autoclave having been thoroughly purged with nitrogen, 900 ml of heptane was placed at 23° C. To the autoclave, 5 Nl of propylene and 90 ml of hydrogen were fed while rotating the stirring blade and ice cooling. Then, the autoclave was heated up to 70° C. and pressurized with ethylene so that the total pressure would become 6 KG. When the internal pressure of the autoclave became 6 KG, 1.0 ml of a hexane solution of triisobutylaluminum (TIBA) (1.0 mM/ml) was forced into the autoclave with nitrogen. Subsequently, 3 ml of the previously prepared toluene solution containing 0.016 mM (in terms of B) of triphenylcarbenium(tetrakispentafluorophenyl)borate and 0.0004 mM of (dimethyl(t-butylamido)(tetramethyl-$\eta^5$-cyclopentadienyl)silane)titanium dichloride was forced into the autoclave with nitrogen to initiate polymerization. Thereafter, for a period of 5 minutes, temperature control of the autoclave was made so that the internal temperature would become 70° C., and ethylene was directly fed so that the pressure would become 6 KG. After 5 minutes from the initiation of polymerization, to the autoclave was fed 5 ml of methanol by means of a pump to terminate polymerization, and the pressure of the autoclave was released to atmospheric pressure. Then, 3 liters of methanol was poured into the reaction solution with stirring. The resulting polymer with the solvent was dried at 130° C. and 600 Torr for 13 hours to obtain 32 g of an ethylene/propylene copolymer. Properties of the resulting polymer are set forth in Table 1.

Polymerization Example 2

35 Grams of a polymer was obtained in the same manner as in Example 1, except that the charge of propylene was changed to 4.5 Nl. Properties of the resulting polymer are set forth in Table 1.

Polymerization Example 3

38 Grams of a polymer was obtained in the same manner as in Example 1, except that the charge of hydrogen was changed to 150 ml and the polymerization time was changed to 4 minutes. Properties of the resulting polymer are set forth in Table 1.

Polymerization Example 4

In a 2-liter autoclave (made of SUS) equipped with a stirring blade, said autoclave having been thoroughly purged with nitrogen, 900 ml of heptane was placed at 23° C. To the autoclave, 38 Nl of propylene was fed while rotating the stirring blade and ice cooling. Then, the autoclave was heated up to 80° C. and pressurized with ethylene so that the total pressure would become 8 KG. When the internal pressure of the autoclave became 8 KG, 1.0 ml of a hexane solution of triisobutylaluminum (TIBA) (1.0 mM/ml) was forced into the autoclave with nitrogen. Subsequently, 3 ml of the previously prepared toluene solution containing 0.1 mM (in terms of Al) of methylaluminoxane and 0.001 mM of bis(1,3-dimethylcyclopentadienyl)zirconium dichloride was forced into the autoclave with nitrogen to initiate polymerization. Thereafter, for a period of 60 minutes, temperature control of the autoclave was made so that the internal temperature would become 80° C., and ethylene was directly fed so that the pressure would become 8 KG. After 60 minutes from the initiation of polymerization, to the autoclave was fed 5 ml of methanol by means of a pump to terminate polymerization, and the pressure of the autoclave was released to atmospheric pressure. Then, 3 liters of methanol was poured into the reaction solution with stirring. The resulting polymer with the solvent was dried at 130° C. and 600 Torr for 13 hours to obtain 34 g of an ethylene/propylene copolymer. Properties of the resulting polymer are set forth in Table 1.

TABLE 1

Properties of Ethylene/Propylene Copolymer

|  | Polymerization Ex. 1 | Polymerization Ex. 2 | Polymerization Ex. 3 | Polymerization Ex. 4 |
| --- | --- | --- | --- | --- |
| Polymer properties |  |  |  |  |
| Ethylene content (wt %) | 69.7 | 73.0 | 71.3 | 71.5 |
| Mw (in terms of PS) × 10000 | 29.1 | 31.8 | 20.5 | 32.1 |
| Mw/Mn | 2.0 | 1.9 | 2.1 | 2.0 |
| DSC-Tm (° C.) | 36.8 | 46.9 | 41.6 | 45.8 |
| 3.31 × E-186 | 44.7 | 55.4 | 50.0 | 50.5 |
| V (%) | 1.5 | 1.4 | 1.5 | 1.8 |
| 10-0.1 × E | 3.0 | 2.7 | 3.0 | 2.9 |
| $I_{10}/I_2$ | 9.4 | 9.8 | 8.2 | 6.3 |
| $S\alpha\beta/S\alpha\alpha$ | 0.15 | 0.16 | 0.15 | 0.15 |

Polymerization Example 5

In a 2-liter continuous polymerization reactor equipped with a stirring blade, said reactor having been thoroughly purged with nitrogen, 1 liter of dehydrated and purified hexane was placed. To the reactor, a hexane solution of ethylaluminum sesquichloride (Al(C$_2$H$_5$)$_{1.5}$·Cl$_{1.5}$) adjusted to a concentration of 8.0 mmol/l was continuously fed for 1 hour at a rate of 500 ml/hr. Then, to the reactor were further continuously fed a hexane solution of VO(OC$_2$H$_5$)Cl$_2$ (as a catalyst) adjusted to a concentration of 0.8 mmol/l at a rate of 500 ml/hr and hexane at a rate of 500 ml/hr. On the other hand, the polymer solution was continuously drawn out from the top of the polymerization reactor so that the amount of the polymer solution in the reactor would be invariably 1 liter. To the reactor were then fed ethylene at a rate of 230 l/hr, propylene at a rate of 70 l/hr and hydrogen at a rate of 4 l/hr using a bubbling tube. The copolymerization reaction was carried out at 35° C. by circulating a cooling medium through a jacket equipped outside the polymerization reactor.

Through the reaction under the above conditions, a polymer solution containing an ethylene/propylene copolymer was obtained. The polymer solution was deashed by the use of hydrochloric acid and then introduced into a large amount of methanol to precipitate the ethylene/propylene copolymer, which was then vacuum dried at 130° C. for 24 hours. Properties of the resulting polymer are set forth in Table 2.

TABLE 2

Polymerization Conditions and Properties of Copolymer

|  | Polymerization Ex. 5 |
| --- | --- |
| Polymerization conditions |  |
| Ethylene (1/hr) | 230 |
| Propylene (1/hr) | 70 |
| Hydrogen (1/hr) | 4 |
| Polymer properties |  |
| Ethylene content (wt %) | 70.5 |
| Mw (in terms of PS) × 10000 | 30.2 |
| Mw/Mn | 2.0 |
| DSC-Tm (° C.) | 26.7 |
| 3.31 × E-186 | 47.4 |
| V (%) | 7.3 |

TABLE 2-continued

Polymerization Conditions and Properties of Copolymer

|  | Polymerization Ex. 5 |
|---|---|
| 10-0.1 × E | 2.9 |
| $I_{10}/I_2$ | 6.1 |
| $S\alpha\beta/S\alpha\alpha$ | 1.47 |

Example 1

A lubricating oil was prepared using 89.04% by weight of a mixed oil of mineral oil 100 Neutral/mineral oil 150 Neutral (available from ESSO Co.) in a mixing ratio of 80/20 as a lubricating oil base, 0.46% by weight of the polymer obtained in Polymerization Example 1 as a viscosity index improver (viscosity modifier), 0.5% by weight of Aclube 133 (available from Sanyo Kasei Co.) as a pour point depressant and 10% by weight of a detergent dispersant (available from Lubrizole Co.). The lubricating oil was evaluated on the lubricating oil performance and flowability at low temperatures. The results are set forth in Table 3.

Examples 2–4, Comparative Example 1

A lubricating oil was prepared in the same manner as in Example 1, except for using a mixed oil of mineral oil 100 Neutral/mineral oil 150 Neutral (available from ESSO Co.) in a mixing ratio of 80/20 as a lubricating oil base and any one of the polymers obtained in Polymerization Examples 2 to 5 as a viscosity index improver in amounts shown in Table 3. The lubricating oil was evaluated on the lubricating oil performance and flowability at low temperatures. The results are set forth in Table 3.

TABLE 3

Composition and Properties of Lubricating Oil

|  | Ex. 1 | Ex. 2 | Ex. 3 | Ex. 4 | Comp. Ex. 1 |
|---|---|---|---|---|---|
| Type of ethylene/propylene copolymer added | Polymerization Ex. 1 | Polymerization Ex. 2 | Polymerization Ex. 3 | Polymerization Ex. 4 | Polymerization Ex. 5 |
| Composition (wt %) | | | | | |
| lubricating oil base | 89.04 | 89.04 | 88.78 | 89.04 | 89.04 |
| detergent dispersant | 10.0 | 10.0 | 10.0 | 10.0 | 10.0 |
| pour point depressant | 0.5 | 0.5 | 0.5 | 0.5 | 0.5 |
| copolymer | 0.46 | 0.46 | 0.72 | 0.46 | 0.46 |
| Lubricating oil performance | | | | | |
| K.V. at 100° C. (mm$^2$/s) | 10.08 | 10.16 | 10.15 | 10.10 | 10.05 |
| SSI | 49.0 | 48.0 | 32.0 | 47.0 | 46.0 |
| CCS | 2880 | 2780 | 2960 | 2820 | 2820 |
| MRV | 28500 | 23200 | 46000 | 24200 | 44500 |
| low-temperature storage stability | AA | AA | AA | AA | AA |
| HTHS | 3.25 | 3.24 | 3.28 | 3.20 | 3.06 |

Polymerization Example 6

Synthesis of Olefin Copolymer

In a 2-liter autoclave (made of SUS) equipped with a stirring blade, said autoclave having been thoroughly purged with nitrogen, 900 ml of heptane was placed at 23° C. To the autoclave, 13 Nl of propylene and 100 ml of hydrogen were fed while rotating the stirring blade and ice cooling. Then, the autoclave was heated up to 70° C. and pressurized with ethylene so that the total pressure would become 6 KG. When the internal pressure of the autoclave became 6 KG, 1.0 ml of a hexane solution of triisobutylaluminum (TIBA) (1.0 mM/ml) was forced into the autoclave with nitrogen. Subsequently, 3 ml of the previously prepared toluene solution containing 0.02 mM (in terms of B) of triphenylcarbenium(tetrakispentafluorophenyl)borate and 0.0005 mM of (dimethyl(t-butylamido)(tetramethyl-$\eta^5$-cyclopentadienyl)silane)titanium dichloride was forced into the autoclave with nitrogen to initiate polymerization. Thereafter, for a period of 5 minutes, temperature control of the autoclave was made so that the internal temperature would become 70° C., and ethylene was directly fed so that the pressure would become 6 KG. After 5 minutes from the initiation of polymerization, to the autoclave was fed 5 ml of methanol by means of a pump to terminate polymerization, and the pressure of the autoclave was released to atmospheric pressure. Then, 3 liters of methanol was poured into the reaction solution with stirring. The resulting polymer with the solvent was dried at 130° C. and 600 Torr for 13 hours to obtain 31 g of an ethylene/propylene copolymer. Properties of the resulting polymer are set forth in Table 4.

Polymerization Example 7

In a 2-liter autoclave (made of SUS) equipped with a stirring blade, said autoclave having been thoroughly purged with nitrogen, 900 ml of heptane was placed at 23° C. To the autoclave, 50 Nl of propylene was fed while rotating the stirring blade and ice cooling. Then, the autoclave was heated up to 60° C. and pressurized with ethylene so that the total pressure would become 8 KG. When the internal pressure of the autoclave became 8 KG, 1.0 ml of a hexane solution of triisobutylaluminum (TIBA) (1.0 mM/ml) was forced into the autoclave with nitrogen. Subsequently, 3 ml of the previously prepared toluene solution containing 0.2 mM (in terms of Al) of methylaluminoxane and 0.002 mM of bis(1,3-dimethylcyclopentadienyl)zirconium dichloride was forced into the autoclave with nitrogen to initiate polymerization. Thereafter, for a period of 60 minutes, temperature control of the autoclave was made so that the internal temperature would become 60° C., and ethylene was directly fed so that the pressure would become 8 KG. After 60 minutes from the initiation of polymerization, to the autoclave was fed 5 ml of methanol by means of a pump to terminate polymerization, and the pressure of the autoclave was released to atmospheric pressure. Then, 3 liters of methanol was poured into the reaction solution with stirring. The resulting polymer with the solvent was dried at 130° C. and 600 Torr for 13 hours to obtain 34 g of an ethylene/propylene copolymer. Properties of the resulting polymer are set forth in Table 4.

Polymerization Example 8

In a 2-liter continuous polymerization reactor equipped with a stirring blade, said reactor having been thoroughly purged with nitrogen, 1 liter of dehydrated and purified hexane was placed. To the reactor, a hexane solution of ethylaluminum sesquichloride (Al(C$_2$H$_5$)$_{1.5}$·Cl$_{1.5}$) adjusted to a concentration of 8.0 mmol/l was continuously fed for 1 hour at a rate of 500 ml/hr. Then, to the reactor were further continuously fed a hexane solution of VO(OC$_2$H$_5$)Cl$_2$ (as a catalyst) adjusted to a concentration of 0.8 mmol/l at a rate of 500 ml/hr and hexane at a rate of 500 ml/hr. On the other hand, the polymer solution was continuously drawn out from the top of the polymerization reactor so that the amount of the polymer solution in the reactor would be invariably 1 liter. To the reactor were then fed ethylene at a rate of 180

1/hr and propylene at a rate of 120 l/hr using a bubbling tube. The copolymerization reaction was carried out at 35° C. by circulating a cooling medium through a jacket equipped outside the polymerization reactor.

Through the reaction under the above conditions, a polymer solution containing an ethylene/propylene copolymer was obtained. The polymer solution was deashed by the use of hydrochloric acid and then introduced into a large amount of methanol to precipitate the ethylene/propylene copolymer, which was then vacuum dried at 130° C. for 24 hours. Properties of the resulting polymer are set forth in Table 4.

TABLE 4

Properties of Ethylene/Propylene Copolymer

|  | Polymerization Ex. 6 | Polymerization Ex. 7 | Polymerization Ex. 8 |
|---|---|---|---|
| Polymer properties |  |  |  |
| Ethylene content (wt %) | 47.2 | 46.8 | 49.6 |
| Mw (in terms of PS) × 10000 | 19.6 | 20.1 | 19.2 |
| Mw/Mn | 2.1 | 2.0 | 1.8 |
| DSC-Tm (° C.) | −38.5 | −36.2 | −40.8 |
| 3.31 × E-186 | −29.8 | −31.1 | −21.8 |
| V (%) | 2.3 | 3.2 | 15.9 |
| 10-0.1 × E | 5.3 | 5.2 | 5.0 |
| $I_{10}/I_2$ | 7.2 | 6.0 | 6.2 |
| $S\alpha\beta/S\alpha\alpha$ | 0.13 | 0.14 | 1.50 |

Example 5

A lubricating oil was prepared using 88.78% by weight of a mixed oil of mineral oil 100 Neutral/mineral oil 150 Neutral (available from ESSO Co.) in a mixing ratio of 80/20 as a lubricating oil base, 0.72% by weight of the polymer obtained in Polymerization Example 6 as a viscosity index improver, 0.5% by weight of Aclube 133 (available from Sanyo Kasei Co.) as a pour point depressant and 10% by weight of a detergent dispersant (available from Lubrizole Co.). The lubricating oil was evaluated on the lubricating oil performance and flowability at low temperatures. The results are set forth in Table 5.

Example 6, Comparative Example 2

A lubricating oil was prepared in the same manner as in Example 5, except for using a mixed oil of mineral oil 100 Neutral/mineral oil 150 Neutral (available from ESSO Co.) in a mixing ratio of 80/20 as a lubricating oil base and the polymer obtained in Polymerization Example 7 or 8 as a viscosity index improver in amounts shown in Table 5. The lubricating oil was evaluated on the lubricating oil performance and flowability at low temperatures. The results are set forth in Table 5.

TABLE 5

Composition and Properties of Lubricating Oil

|  | Ex. 5 | Ex. 6 | Comp. Ex. 2 |
|---|---|---|---|
| Type of ethylene/propylene copolymer added | Polymerization Ex. 6 | Polymerization Ex. 7 | Polymerization Ex. 8 |
| Composition (wt %) |  |  |  |
| lubricating oil base | 88.78 | 88.77 | 88.78 |
| detergent dispersant | 10.0 | 10.0 | 10.0 |
| pour point depressant | 0.5 | 0.5 | 0.5 |
| copolymer | 0.72 | 0.73 | 0.72 |
| Lubricating oil performance |  |  |  |
| K.V. at 100° C. (mm$^2$/s) | 10.20 | 10.24 | 10.22 |
| SSI | 34.0 | 34.0 | 33.0 |
| CCS | 3240 | 3200 | 3300 |
| MRV | 41000 | 40000 | 48000 |
| low-temperature flowability | AA | AA | AA |
| HTHS | 3.28 | 3.24 | 3.08 |

Polymerization Example 9

Synthesis of Olefin Copolymer

In a 2-liter autoclave (made of SUS) equipped with a stirring blade, said autoclave having been thoroughly purged with nitrogen, 900 ml of heptane was placed at 23° C. To the autoclave, 5 Nl of propylene and 90 ml of hydrogen were fed while rotating the stirring blade and ice cooling. Then, the autoclave was heated up to 70° C. and pressurized with ethylene so that the total pressure would become 6 KG. When the internal pressure of the autoclave became 6 KG, 1.0 ml of a hexane solution of triisobutylaluminum (TIBA) (1.0 mM/ml) was forced into the autoclave with nitrogen. Subsequently, 3 ml of the previously prepared toluene solution containing 0.01 mM (in terms of Al) of methylaluminoxane and 0.0004 mM of (dimethyl(t-butylamido) (tetramethyl-$\eta^5$-cyclopentadienyl)silane)titanium dichloride was forced into the autoclave with nitrogen to initiate polymerization. Thereafter, for a period of 5 minutes, temperature control of the autoclave was made so that the internal temperature would become 70° C., and ethylene was directly fed so that the pressure would become 6 kg. After 5 minutes from the initiation of polymerization, to the autoclave was fed 5 ml of methanol by means of a pump to terminate polymerization, and the pressure of the autoclave was released to atmospheric pressure. Then, 3 liters of methanol was poured into the reaction solution with stirring. The resulting polymer with the solvent was dried at 130° C. and 600 Torr for 13 hours to obtain 35 g of an ethylene/propylene copolymer. Properties of the resulting polymer are set forth in Table 6.

Polymerization Example 10

In a 2-liter autoclave (made of SUS) equipped with a stirring blade, said autoclave having been thoroughly purged with nitrogen, 900 ml of heptane was placed at 23° C. To the autoclave, 6 Nl of propylene and 120 ml of hydrogen were fed while rotating the stirring blade and ice cooling. Then, the autoclave was heated up to 40° C. and pressurized with ethylene so that the total pressure would become 6 KG. When the internal pressure of the autoclave became 6 KG, 1.0 ml of a hexane solution of triisobutylaluminum (TIBA) (1.0 mM/ml) was forced into the autoclave with nitrogen. Subsequently, 3 ml of the previously prepared toluene solution containing 0.016 mM (in terms of B) of triphenylcarbenium(tetrakispentafluorophenyl)borate and 0.0004 mM of (dimethyl(t-butylamido)(tetramethyl-$\eta^5$-cyclopentadienyl)silane)titanium dichloride was forced into the autoclave with nitrogen to initiate polymerization. Thereafter, for a period of 5 minutes, temperature control of the autoclave was made so that the internal temperature would become 40° C., and ethylene was directly fed so that the pressure would become 6 KG. After 5 minutes from the initiation of polymerization, to the autoclave was fed 5 ml of methanol by means of a pump to terminate polymerization, and the pressure of the autoclave was released to atmospheric pressure. Then, 3 liters of methanol was poured into the reaction solution with stirring. The resulting polymer with the solvent was dried at 130° C. and 600 Torr for 13 hours to obtain 18 g of an ethylene/propylene copolymer. Properties of the resulting polymer are set forth in Table 6.

TABLE 6

Properties of Ethylene/Propylene Copolymer

|  | Polymerization Ex. 9 | Polymerization Ex. 10 |
| --- | --- | --- |
| Polymer properties |  |  |
| Ethylene content (wt %) | 70.5 | 70.8 |
| Mw (in terms of PS) × 10000 | 29.5 | 31.9 |
| Mw/Mn | 2.0 | 1.8 |
| DSC-Tm (° C.) | 44.5 | 39.0 |
| 3.31 × E-186 | 47.4 | 58.3 |
| V (%) | 1.5 | 1.4 |
| 10-0.1 × E | 3.0 | 2.7 |
| $I_{10}/I_2$ | 9.4 | 6.8 |
| Sαβ/Sαα | 0.15 | 0.15 |

Example 7, Example 8

A lubricating oil was prepared using a mixed oil of mineral oil 100 Neutral/mineral oil 150 Neutral (available from ESSO Co.) in a mixing ratio of 80/20 as a lubricating oil base, 0.46% by weight of the polymer obtained in Polymerization Example 9 or 10 as a viscosity index improver, 0.5% by weight of Aclube 133 (available from Sanyo Kasei Co.) as a pour point depressant and 10% by weight of a detergent dispersant (available from Lubrizole Co.). The lubricating oil was evaluated on the lubricating oil performance and flowability at low temperatures. The results are set forth in Table 7.

TABLE 7

Composition and Properties of Lubricating Oil

|  | Ex. 7 | Ex. 8 |
| --- | --- | --- |
| Type of ethylene/propylene copolymer added | Polymerization Ex. 9 | Polymerization Ex. 10 |
| Composition (wt %) |  |  |
| lubricating oil base | 89.04 | 89.04 |
| Detergent dispersant | 10.0 | 10.0 |
| Pour point depressant | 0.5 | 0.5 |
| Copolymer | 0.46 | 0.46 |
| Lubricating oil performance |  |  |
| K.V. at 100° C. (mm²/s) | 10.10 | 10.16 |
| SSI | 49.0 | 46.0 |
| CCS | 2910 | 2720 |
| MRV | 31500 | 22500 |
| Low-temperature flowability | AA | AA |
| HTHS | 3.25 | 3.20 |

What is claimed is:

1. A viscosity modifier for lubricating oil, comprising an ethylene/α-olefin copolymer which is a copolymer of ethylene and an α-olefin of 3 to 20 carbon atoms and has the following properties:
   (1) the ethylene content (E) is in the range of 40 to 77% by weight,
   (2) the weight-average molecular weight (Mw) in terms of polystyrene, as measured by GPC, is in the range of 80,000 to 400,000,
   (3) Mw/Mn is not more than 2.4,
   (4) the melting point (Tm), as measured by DSC, is not higher than 60° C.,
   (5) the ethylene content (E, % by weight) and the melting point (Tm, °C.), as measured by DSC, satisfy the following relation (I):

$$3.31 \times E - 186 \geq Tm \tag{I}$$

and
   (6) the intensity ratio, Sαβ/Sαα, measured by $^{13}$C-NMR spectrum is not more than 0.5.

2. The viscosity modifier for lubricating oil as claimed in claim 1, wherein the ethylene/α-olefin copolymer is an ethylene/propylene copolymer.

3. A lubricating oil composition comprising:
   (A) a lubricating oil base, and
   (B) an ethylene/α-olefin copolymer which is a copolymer of ethylene and an α-olefin of 3 to 20 carbon atoms and has the following properties:
   (1) the ethylene content (E) is in the range of 40 to 77% by weight,
   (2) the weight-average molecular weight (Mw) in terms of polystyrene, as measured by GPC, is in the range of 80,000 to 400,000,
   (3) Mw/Mn is not more than 2.4,
   (4) the melting point (Tm), as measured by DSC, is not higher than 60° C.,
   (5) the ethylene content (E, % by weight) and the melting point (Tm, ° C.), as measured by DSC, satisfy the following relation (I):

$$3.31 \times E - 186 \geq Tm \tag{I}$$

and
   (6) the intensity ratio, Sαβ/Sαα, measured by 13C-NMR spectrum is not more than 0.5;
   wherein the ethylene/α-olefin polymer (B) is contained in an amount of 1 to 20% by weight.

4. A lubricating oil composition comprising
   a lubricating oil base (A);
   an ethylene/α-olefin copolymer (B) which is a copolymer of ethylene and an α-olefin of 3 to 20 carbon atoms and has the following properties:
   (1) the ethylene content (E) is in the range of 40 to 77% by weight,
   (2) the weight-average molecular weight (Mw) in terms of polystyrene, as measured by GPC, is in the range of 80,000 to 400, 000,
   (3) Mw/Mn is not more than 2.4,
   (4) the melting point (Tm), as measured by DSC, is not higher than 60° C.,
   (5) the ethylene content (E, % by weight) and the melting point (Tm, ° C.), as measured by DSC, satisfy the following relation (I):

$$3.31 \times E - 186 \geq Tm \tag{I}$$

and (6) the intensity ratio, Sαβ/Sαα, measured by $^{13}$C-NMR spectrum is not more than 0.5; and a pour point depressant (C), wherein:
the ethylene/α olefin copolymer (B) is contained in an amount of 0.1 to 5% by weight, and
the pour point depressant (C) is contained in an amount of 0.05 to 5% by weight.

5. The lubricating oil composition as claimed in claim 3 or 4, wherein the ethylene/α-olefin copolymer (B) is an ethylene/α-olefin copolymer (B-1) having the following properties:

(1) the ethylene content (E) is in the range of 65 to 77% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is in the range of 15 to 60° C., (5) the ethylene content (E, % by weight) and the melting point (Tm, ° C.), as measured by DSC, satisfy the following relation (I):

$$3.31 \times E - 186 \geq Tm \quad (I),$$

and (6) the intensity ratio, Sαβ/Sαα, measured by $^{13}$C-NMR spectrum is not more than 0.5.

6. The lubricating oil composition as claimed in claim 3 or 4, wherein the ethylene/α-olefin copolymer (B) is an ethylene/α-olefin copolymer (B-2) having the following properties:

(1) the ethylene content (E) is in the range of 40 to 55% by weight, (2) the weight-average molecular weight (Mw) in terms of polystyrene, as measured by GPC, is in the range of 80,000 to 400,000, (3) Mw/Mn is not more than 2.4, (4) the melting point (Tm), as measured by DSC, is not higher than −20° C., (5) the ethylene content (E, % by weight) and the melting point (Tm, ° C.), as measured by DSC, satisfy the following relation (I):

$$3.31 \times E - 186 \geq Tm \quad (I),$$

and (6) the intensity ratio, Sαβ/Sαα, measured by $^{13}$C-NMR spectrum is not more than 0.5.

7. The lubricating oil composition as claimed in claim 3 or 4, wherein the ethylene/α-olefin copolymer (B) is an ethylene/propylene copolymer.

8. The lubricating oil composition as claimed in claim 3 or 4, wherein the ethylene/α-olefin copolymer (B) is an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg ranging from 8 to 16.

9. The lubricating oil composition as claimed in claim 3 or 4, wherein the ethylene/α-olefin copolymer (B) is an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg being not less than 5 and less than 8.

10. The lubricating oil composition as claimed in claim 5, wherein the ethylene/β-olefin copolymer B is an ethylene/propylene copolymer.

11. The lubricating oil composition as claimed in claim 6, wherein the ethylene/α-olefin copolymer (B) is an ethylene/propylene copolymer.

12. The lubricating oil composition as claimed in claim 5, wherein the ethyiene/α-olefin copolymer (B) is an ethyiene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg ranging from 8 to 16.

13. The lubricating oil composition as claimed in claim 6, wherein the ethylene/α-olefin copolymer (B) is an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg ranging from 8 to 16.

14. The lubricating oil composition as claimed in claim 7, wherein the ethylene/α-olefin copolymer (B) is an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg ranging from 8 to 16.

15. The lubricating oil composition as claimed in claim 5, wherein the ethylene/α-olefin copolymer (B) is an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg being not less than 5 and less than 8.

16. The lubricating oil composition as claimed in claim 6, wherein the ethylene/u-olefin copolymer (B) is an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg being not less than 5 and less than 8.

17. The lubricating oil composition as claimed in claim 7, wherein the ethylene/α-olefin copolymer (B) is an ethylene/α-olefin copolymer having a ratio ($I_{10}/I_2$) of the melt index ($I_{10}$) as measured at 190° C. under a load of 10 kg to the melt index ($I_2$) as measured at 190° C. under a load of 2.16 kg being not less than 5 and less than 8.

* * * * *